> 3,459,513
> PROCESS OF EXTRACTION OF POLONIUM
> Claudette Cimetiere, Chatenay-Malabry, Jean Desroches, Malakoff, and Claude Routier, Paris, France, assignors to Commissariat à l'Energie Atomique
> No Drawing. Filed Mar. 3, 1966, Ser. No. 531,366
> Claims priority, application France, Mar. 17, 1965, 9,572
> Int. Cl. B01j 1/22; B01d 15/08; C01g 57/00
> U.S. Cl. 23—312     7 Claims

ABSTRACT OF THE DISCLOSURE

A process is provided for the extraction of polonium from a mixture of bismuth and polonium wherein the mixture of bismuth and polonium is dissolved in a 0.5 to 2.0 N solution of nitric or hydrochloric acid, the acid solution obtained is contacted with activated charcoal for a time which is sufficient to absorb a substantial amount of the polonium, the acid solution containing the bismuth is separated from the activated charcoal and the polonium absorbed on the activated charcoal is desorbed therefrom by contacting the activated charcoal with 5 to 7 N nitric acid or by contacting the activated charcoal with metallic silver in a hydrochloric acid solution.

---

This invention is directed to a process for the extraction of polonium which is formed by neutron irradiation of bismuth or a compound of this metal.

Polonium-210 is obtained by neutrol irradiation of bismuth-209 or a compound of bismuth. Under irradiation, bismuth is transformed into its radioactive isotope 210 which is a $\beta$ emitter, the decay of which produces polonium-210.

It is known to effect the recovery of polonium formed in irradiated bismuth by dissolving this latter in a hydrochloric acid solution, the polonium being then extracted from this solution by means of a suitable oragnic solvent. Another method consists in dissolving the irradiated bismuth in a hydrochloric acid solution and in extracting the polonium by adsorption on copper elements followed by desorption by vacuum distillation.

These methods are complicated and only permit of recovery of a small proportion of the polonium which is formed.

It has also been proposed to effect the separation of polonium contained in the polonium-bismuth mixture by dissolving said mixture in a hydrochloric acid solution, then contacting the solution thus obtained with ion-exchange resins which absorb the polonium and the bismuth. The bismuth is then desorbed by concentrated hydrochloric acid and the polonium is desorbed by concentrated nitric acid.

However, this method is subject to many disadvantages which are essentially due to the use of ion exchange resins. In point of fact, said resins are costly materials which have a limited life in this application inasmuch as they suffer degradation under the action of radiation. Furthermore, the products of radiolysis contaminate the polonium solution which in finally obtained.

The present invention is directed to a process for the extraction of polonium which makes it possible to overcome these disadvantages by virtue of the use of activated charcoal as adsorbent since this is an inexpensive material which does not decompose to any appreciable degree under the action of radiation and which, in addition, does not react with the acids employed in the desorption process.

To this end, the invention proposes a process for the extraction of polonium from a mixture containing bismuth, said process being essentially characterized in that it consists in dissolving said mixture in a strong mineral acid solution, in contacting the solution obtained with activated charcoal and in effecting the desorption of the polonium absorbed on the activated charcoal by means of an acid solution.

The strong mineral acid which is employed for the purpose of dissolving bismuth or its compounds is preferably a nitric acid solution having a normal concentration within the range of 0.5 N to 2 N and preferably of the order of 1 N; it would nevertheless remain feasible to employ other acid solutions such as for example, a hydrochloric acid solution having a normal concentration within the range of 0.5 N to 2 N and preferably of the order of 1 N.

The kinetics of adsorption of polonium on activated charcoal have been studied; in the case of a concentration of polonium of $5.3 \times 10^{-7}$ gram-atoms per liter in a 1 N $HNO_3$ medium, and depending on the contacting time, absorption rates have been obtained as recorded in Table 1 below.

TABLE 1

| Contacting time, hours: | Adsorption, percent |
|---|---|
| 1 | 17.7 |
| 4 | 35 |
| 6 | 48.8 |
| 19 | 89.4 |
| 24 | 93.5 |

It is observed that a contacting time of at least 19 hours is necessary in order to obtain a sufficient rate of adsorption of polonium.

The formula which represents the kinetics of adsorption is deduced by calculation and is as follows:

$$C = 100\,(1 - e^{-0.1153t})$$

wherein:

C = adsorption rate as percent
t = contacting time in hours

The desorption of polonium can be carried out by grinding activated charcoal to a particle size in the range of $500\mu$ to $2000\mu$ and in oxidizing it with concentrated nitric acid. This desorption can also be obtained by contacting the activated charcoal which has adsorbed the polonium with metallic silver in a hydrochloric acid solution; after a certain contacting time, the polonium migrates from the charcoal onto the silver.

Polonium desorption can also be effected by washing the activated charcoal with a nitric acid solution having a concentration within the range of 5 to 7 N and preferably in the vicinity of 6 N, which makes it possible to recover the entire amount of polonium adsorbed.

The adsorption operation must be carried out in a vessel which is fabricated of a material having low polonium-adsorption characteristics. To this end, after a number of different tests, the thermal glass of the type known as "Pyrex" has been selected since it has a lower adsorption capacity than materials such as polytetrafluoroethylene or polyvinyl chloride, for example. Thus, after 19 hours of contacting of a normal nitric acid solution of polonium containing $4.6 \times 10^{-7}$ gram-atoms of polonium per liter with one of these materials, the following adsorptions have been observed:

4.2% in the case of Pyrex glass
5.4% in the case of polyetrafluoroethylene
17.5% in the case of plasticized polyvinyl chloride.

Consequently, when the operation is carried out in a Pyrex glass vessel, a low percentage of polonium is adsorbed on this material.

The grains of activated charcoal are ground so as to have a particle diameter between 0.2 and 0.5 mm.; the charcoal which is thus ground is then washed with 3 N nitric acid, rinsed with distilled water a number of times, then dried before being employed for the adsorption process.

Adsorption tests have been carried out at different pH values using different concentrations of polonium; the results obtained, which corresponds to a contacting time of 19 hours, appear in the following table:

TABLE 2

| pH | Initial concentration of polonium in gram-atoms per liter | | | | | |
|---|---|---|---|---|---|---|
| | Adsorption of polonium as percent | | | | | |
| | $2.5 \cdot 10^{-9}$ | | | $3 \cdot 10^{-3}$ | | |
| | Total | On glass | On activated charcoal | Total | On glass | On activated charcoal |
| 0 | 89.2 | 4.2 | 85 | 86.5 | 10.9 | 75.6 |
| 1 | 74.7 | 9.8 | 64.9 | 63.4 | 21.2 | 42.2 |
| 2 | 80 | 14.4 | 65.6 | 74 | 16.6 | 57.4 |
| 3 | 81.7 | 19.7 | 62 | 68.3 | 34.6 | 33.7 |
| 4 | 80 | 32.8 | 47.2 | 75.9 | 45.2 | 30.7 |
| 5 | 86 | 19.3 | 66.7 | 78 | 23.2 | 54.8 |
| 6 | 70.8 | 15 | 55.8 | 77.4 | 16.8 | 60.6 |
| 7 | 74.4 | 29.3 | 45.1 | 78 | 27.6 | 50.4 |
| 8 | 71.2 | 33 | 38.2 | 71 | 40.8 | 30.2 |

It will be observed from this table that there is a maximum of adsorption in the vicinity of pH=0 and another maxim in the vicinity of pH=4 to 6.

In order to recover the polonium which is formed at the time of irradiation of bismuth or its compounds, these latter are dissolved, after irradiation in a reactor channel, in a strong mineral acid solution which can be, for example, nitric acid or hydrochloric acid to which hydrogen peroxide may be added if necessary. After dissolution, the liquid obtained is contacted with activated charcoal for a sufficient period of time which depends on the starting concentration of polonium in order to ensure maximum adsorption of the polonium. The operation is preferably carried out at room temperature, that is to say at a temperature of the order of 15° to 20° C. It is usually necessary to carry out two operations, by stopping the first at an adsorption rate of 75% and by re-contacting the solution with the activated charcoal, thereby achieving an adsorption yield in the vicinity of 100%.

The bismuth is not absorbed by the activated charcoal; this has been verified by contacting solutions of bismuth nitrate in 1 N nitric acid with activated charcoal over a period of 24 hours. After a number of washings of activated charcoal by nitric acid, the resulting solution no longer contained any detectable trace of bismuth.

A better understanding of the invention will be gained from the following description of one example of application of the process according to the invention, said example being given without any limitation being implied.

100 g. of bismuth oxide was irradiated in a reactor channel over a period of 270 days made it possible to obtain 1 curie of polonium-210. The bismuth oixide is dissolved in a normal nitric acid solution and the solution obtained is contacted with activated charcoal having a particle diameter in the range of 0.05 mm. to 1 mm. for a period of 19 hours. At the end of this time, 75% of the polonium which is present in the solution is recovered. The quantity of bismith entrained is at a maximum 5 p.p.m. (limit of precision of analysis). The enrichment factor $f$ can readily be calculated and is given by the formula:

$$F = \frac{\left(\frac{Po}{Bi}\right)_{final}}{\left(\frac{Po}{Bi}\right)_{initial}}$$

In this example, it is possible to obtain an enrichment factor which is higher than or equal to 150,000 whereas is was scarcely possible by the method of the prior art to exceed values of F of the order of 2,500. The initial solution is again contacted with activated charcoal for a period of 19 hours and it is thus possible to recover the remainder of the polonium, with a resulting adsorption yield of 100%. The desorption is effected by oxidation of the powdered activated charcoal by means of concentrated $HNO_3$.

What we claim is:

1. A process for extraction of polonium from a mixture of bismuth and polonium, comprising dissolving said mixture in a 0.5 to 2.0 N acid solution, said acid being selected from the group consisting of nitric acid and hydrochloric acid, contacting the acid solution obtained with activated charcoal for a time sufficient to absorb a substantial amount of polonium, separating the acid solution containing the bismuth from the activated charcoal and contacting the separated activated charcoal with 5 to 7 N nitric acid to desorb the polonium absorbed thereon.

2. The process of claim 1 wherein the acid solution for dissolving said mixture is a nitric acid solution having a concentration of about 1 N.

3. The process of claim 1 wherein the acid solution for dissolving said mixture is a hydrochloric acid solution having a concentration of about 1 N.

4. The process of claim 1 wherein the desorption of the polonium from the activated charcoal comprises grinding said activated charcoal to a particle diameter between 200 microns and 500 microns and oxidizing the ground activated charcoal by contacting it with the nitric acid.

5. The process of claim 1 wherein the activated charcoal containing the absorbed polonium is washed with nitric acid solution having a concentration of about 6 N to desorb said polonium.

6. A process for extraction of polonium from a mixture of bismuth and polonium, comprising dissolving said mixture in a 0.5 to 2 N acid solution, said acid being selected from the group consisting of nitric acid and hydrochloric acid, contacting the acid solution obtained with activated charcoal for a time sufficient to absorb a substantial amount of the polonium, separating the acid solution containing the bismuth from the activated charcoal and contacting the separated activated charcoal with metallic silver in a hydrochloric acid solution to desorb the polonium absorbed thereon.

7. The process of claim 1 wherein the acid solution obtained is contacted with the activated charcoal at a temperature of about 15 to 20° C.

References Cited

UNITED STATES PATENTS

| 2,191,063 | 2/1940 | Smit | 210—39 X |
| 2,809,938 | 10/1957 | Goren | 252—422 |
| 2,873,170 | 2/1959 | Hyde | 23—312 X |
| 2,877,093 | 3/1959 | Thompkins | 23—312 X |
| 2,894,817 | 7/1959 | Karraker | 23—312 X |
| 2,855,269 | 10/1958 | Boyd | 210—24 X |

OTHER REFERENCES

Journal of Applied Chemistry (Taushkanov), vol. 15, November 1965, page ii–452 (copy 23–312).

NORMAN YUDKOFF, Primary Examiner

S. J. EMERY, Assistant Examiner

U.S. Cl. X.R.

23—78, 102; 210—40